Nov. 10, 1925.
J. W. PLATT ET AL
1,561,109
FOWL DISPLAY HANGER
Filed Feb. 21, 1925
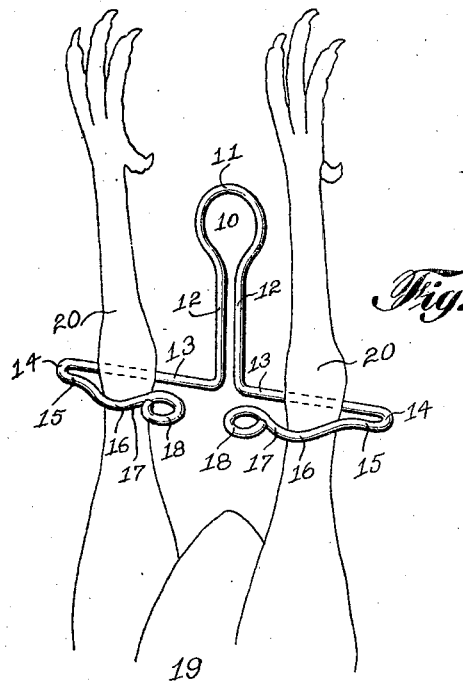
Fig. 1.
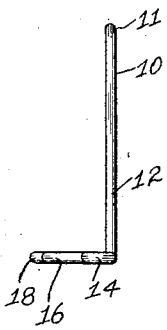
Fig. 2.
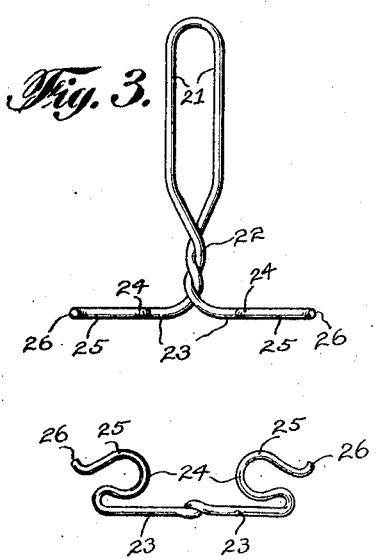
Fig. 3.
Fig. 4.
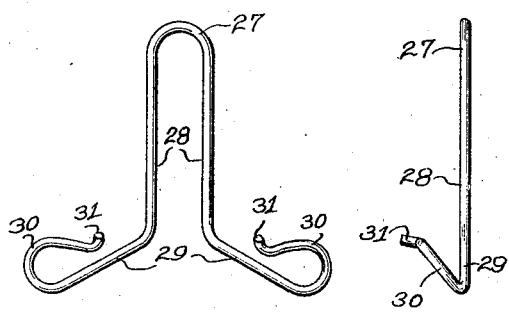
Fig. 5.  Fig. 6.
INVENTORS
John W. Platt
Arthur E. Kramer
BY: H. G. Manning
ATTORNEY Patented Nov. 10, 1925.

1,561,109

UNITED STATES PATENT OFFICE.

JOHN W. PLATT AND ARTHUR E. KRAMER, OF WATERVILLE, CONNECTICUT.

FOWL-DISPLAY HANGER.

Application filed February 21, 1925. Serial No. 10,829.

*To all whom it may concern:*

Be it known that we, JOHN W. PLATT and ARTHUR E. KRAMER, citizens of the United States, and residents of Waterville, county of New Haven, and State of Connecticut, have invented certain new and useful Improvements in Fowl-Display Hangers, of which the following is a specification.

This invention relates to poultry display hangers, and more particularly to a hanger for displaying a killed fowl in a meat market.

One object of this invention is to provide a poultry display hanger consisting of an upper vertical loop to be hung upon a wall-hook or other support, and a pair of lower laterally extending loops in which the legs of a fowl are adapted to be engaged.

A further object is to provide a display hanger of the above nature provided with resilient lateral leg-engaging loops each of which is open on one side to permit one of the legs of a fowl to be readily inserted therein and removed therefrom.

A further object is to provide a display hanger of the above nature in which the legs of the fowl will be held widely separated from each other so as to prevent sweating and rotting of the meat.

A further object is to provide a device of the above nature which will be simple in construction, inexpensive to manufacture, easy to manipulate, ornamental in appearance, and very efficient and durable in use.

With these and other objects in view, there have been illustrated on the accompanying drawings, several forms in which the invention may be conveniently embodied in practice.

Fig. 1 represents a perspective view of a preferred form of poultry display hanger showing a fowl suspended therefrom.

Fig. 2 is a side view of the display hanger shown in Fig. 1.

Figs. 3 and 4 are front and bottom views, respectively, of a modified form of poultry hanger also embodying the invention.

Figs. 5 and 6 are front and side views, respectively, of another modified form of poultry hanger.

Referring now to the drawings in which like reference numerals denote corresponding parts throughout the several views, the first form of display hanger shown in Figs. 1 and 2 is preferably constructed of wire and comprises an upper loop portion 10, having an oval shaped upper end 11, and a pair of vertical side shanks 12.

The shanks 12 are integrally connected at their lower ends to a pair of horizontal resilient leg-engaging members comprising outwardly extending straight sections 13 joined at 14 to a pair of inwardly extending curved sections 15, said sections 13 and 15 forming open loops with their openings adjacent the shanks 12. The sections 15 are bent forwardly at 16 and then rearwardly at 17 and have their extremities formed into closed loops 18, said closed loops serving to prevent scratching the skin of the fowl 19 which is adapted to be hung head downwardly with its legs 20 clamped by said horizontal open loops just above the knee joints thereof.

In operation, when it is desired to suspend a fowl by the display hanger, shown in Figs. 1 and 2, the legs of the fowl will be inserted one at a time through the central space between the inner ends of the open loops. The legs will then be forced outwardly to the right and left of the hanger until they are securely clamped in the resilient curved leg-engaging members in the positions as shown in Fig. 1.

One advantage of this construction is that the resiliency of the spring wire of which the display hanger is made will cause the arms 13 and 15 to resiliently clamp the legs of the fowl in spaced-apart position and prevent them from accidentally coming loose. The fowl may, however, be readily detached from the hanger whenever desired by grasping the legs 20 and forcing them inwardly.

In the modified form of the invention disclosed in Figs. 3 and 4, the upper hook portion of the wire display hanger is composed of a pair of parallel shanks 21, said shanks being twisted together at their bottom portions 22 and then bent outwardly at right angles to form straight members 23. The wire is then curved inwardly at 24 and outwardly at 25 to form a pair of lateral loops with their open ends on the outside, said loops being in lateral alinement with each other. The free extremities of this form of wire hanger are curved forwardly at 26 to prevent possible injury to the legs of a fowl when being inserted between the resilient portions 24 and 25 of said lateral loops.

In the modified form of the invention shown in Figs. 5 and 6, the display hanger comprises a U-shaped hook portion 27 having straight parallel side arms 28, said arms 28 terminating in a pair of downwardly inclined sections 29 located in the plane of the hook portion 27. The extremities of the inclined sections 29 are curved forwardly and upwardly at 30 and lie in a plane which forms an acute angle with the plane of the hook portion 27. The extremities 31 of the curved portions 30 are bent forward sharply so as to prevent injury to the fowl when the legs are being inserted in place.

It will be understood that when using either of the three forms of display hanger herein disclosed, the fowl may be hung by the feet instead of by the knee joints as illustrated, within the spirit of the invention.

It will also be understood that while the hangers are especially adapted to be hung for display on hooks located along the side walls of a market, they may also be hung on overhead beams or in any other desired location.

It is also within the scope of the invention to employ each of the hangers shown for holding a fowl during the killing, bleeding, and plucking operations before being displayed for sale.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the followng claims.

Having thus fully described the invention, what is claimed as new, and for which it is desired to secure Letters Patent, is:

1. In a poultry display hanger, an upper loop adapted to be hung upon a wall-hook or other support in a meat market, a vertical section connected to said loop and a pair of lower laterally extending loops directly connected to said vertical section for supporting the legs of a fowl in spaced-apart position, said lower loops being oppositely disposed and having their centre lines in alinement.

2. In a poultry display hanger, an upper loop adapted to be hung upon a wall-hook or other support in a meat market, directly connected to said vertical section and a pair of lower laterally extending open-ended loops directly connected to said vertical section for supporting the legs of a fowl in spaced-apart position.

3. In a poultry display hanger, an upper loop adapted to be hung upon a wall-hook or other support in a meat market, a vertical section connected to said loop and a pair of lower laterally extending open-ended loops directly connected to said vertical section for supporting the legs of a fowl in spaced-apart position, said laterally extending loops having their open ends extending in opposite directions and having their centre lines in alinement.

4. In a poultry display hanger, an upper loop adapted to be hung upon a wall-hook or other support in a meat market, and a pair of lower laterally extending open-ended loops for supporting the legs of a fowl in spaced-apart position, said laterally extending loops having their open ends extending inwardly.

5. In a poultry display hanger, a loop adapted to be hung on a wall hook in a meat market, and a pair of lateral open ended members for supporting the legs of a fowl with its head down, each of said lateral members having one straight side and an inwardly bent curved side for enclosing one leg of the fowl, a space being left at the centre between said opposite members to permit the entrance of said leg prior to its insertion in the said members.

In testimony whereof, we have affixed our signatures to this specification.

JOHN W. PLATT.
ARTHUR E. KRAMER.